Jan. 26, 1954  R. N. GHERSIN ET AL  2,667,246
MULTIANGULAR CLAMP FOR GLASS PANELS OR THE LIKE
Filed April 3, 1953  5 Sheets-Sheet 1
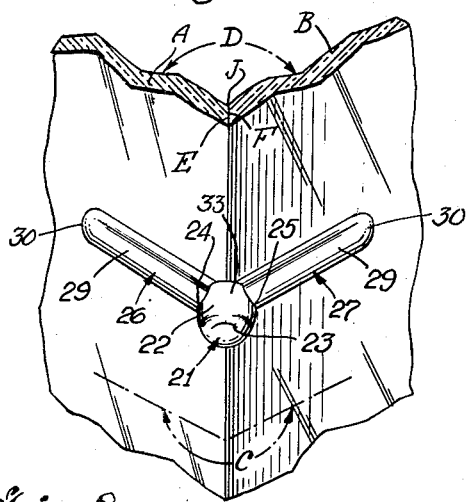
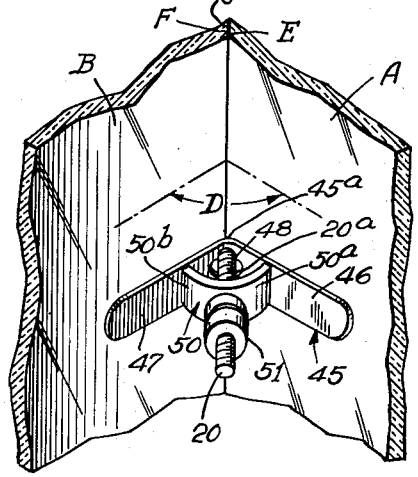
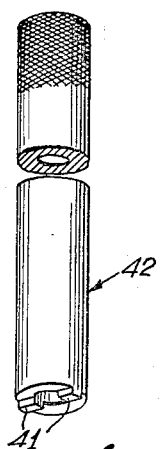
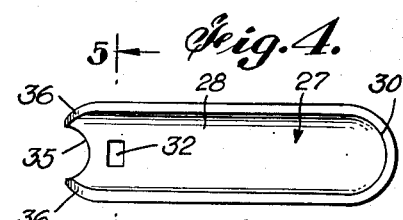
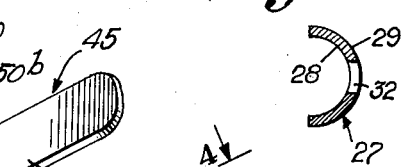
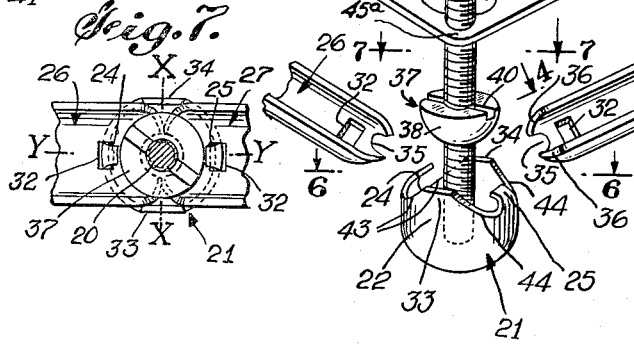
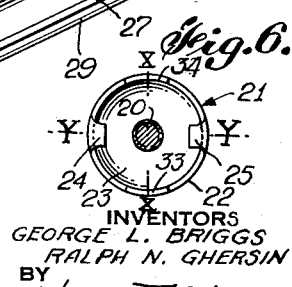
INVENTORS
GEORGE L. BRIGGS
RALPH N. GHERSIN
BY
William T. Knierim
ATTORNEY

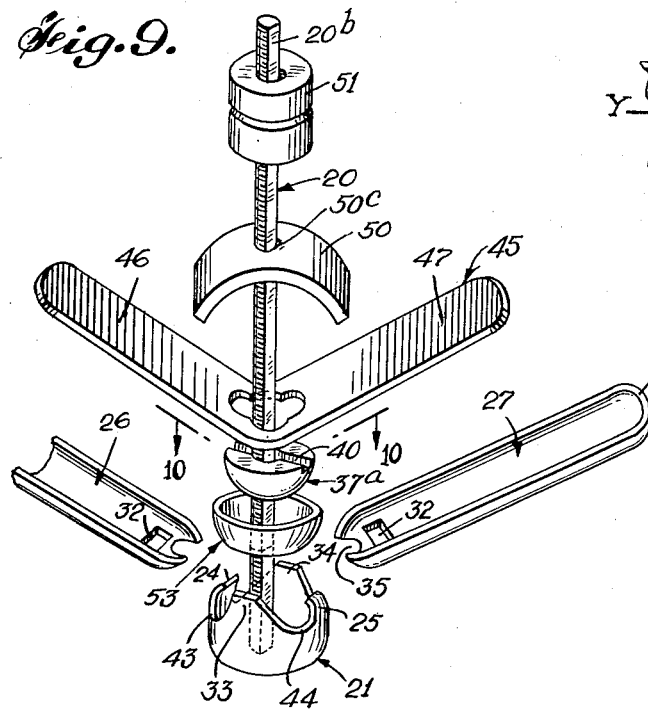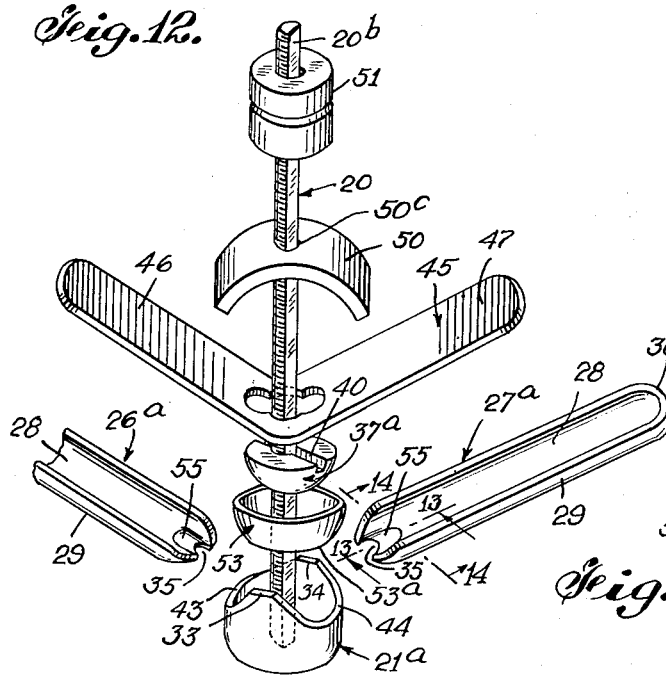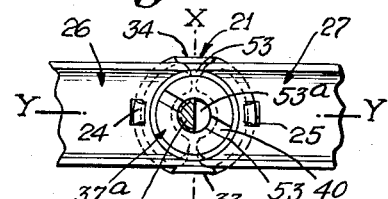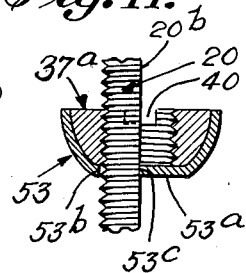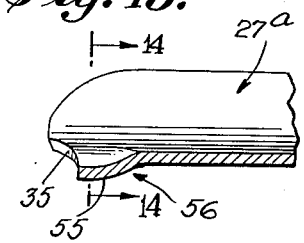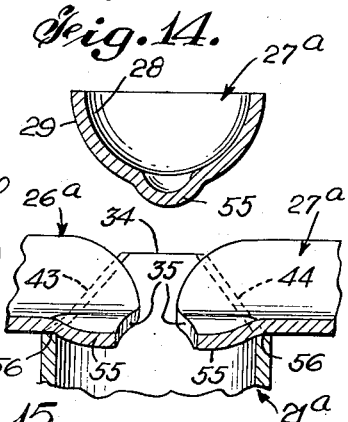

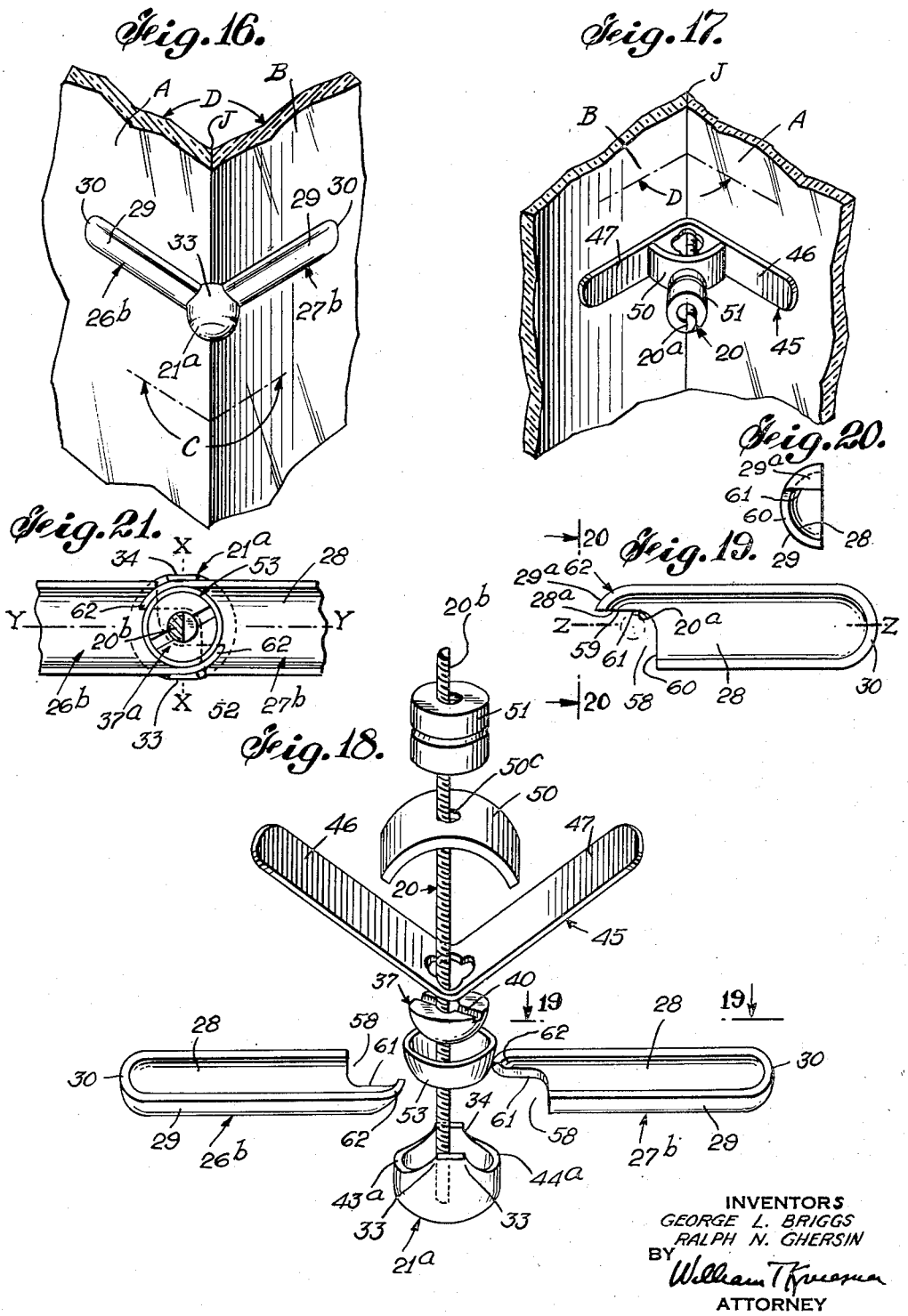

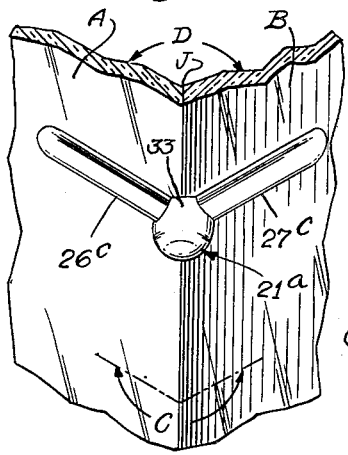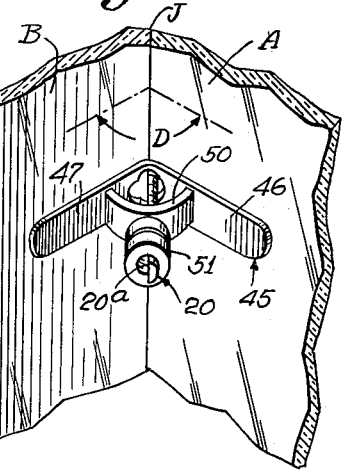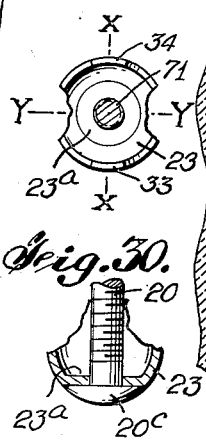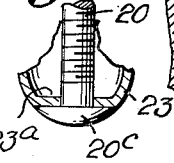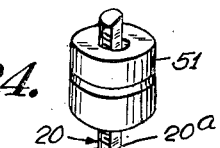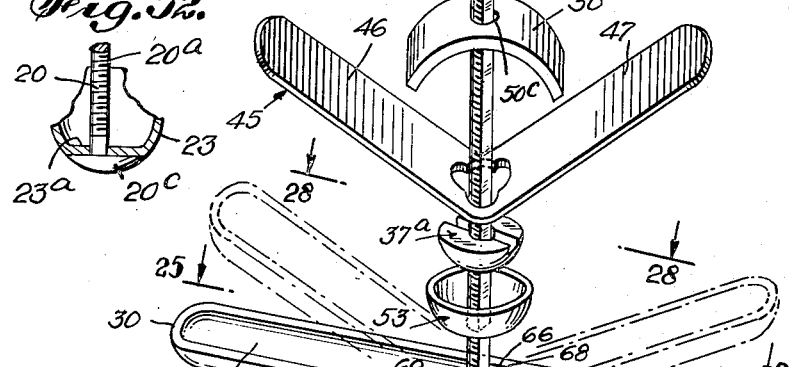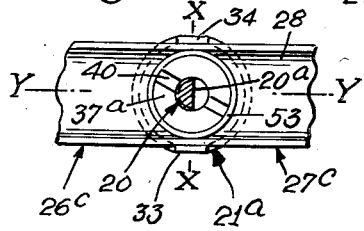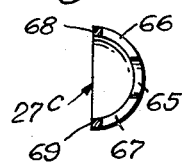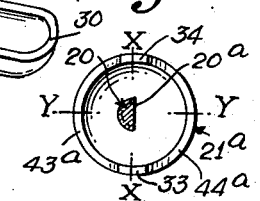
INVENTORS
GEORGE L. BRIGGS
RALPH N. GHERSIN
BY William T. Knisner
ATTORNEY

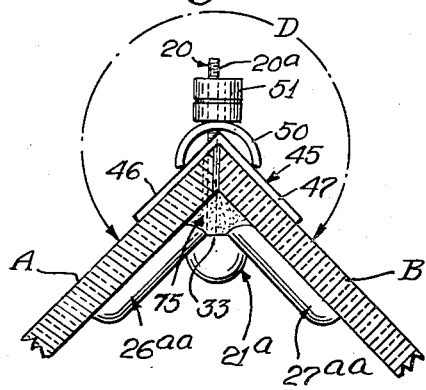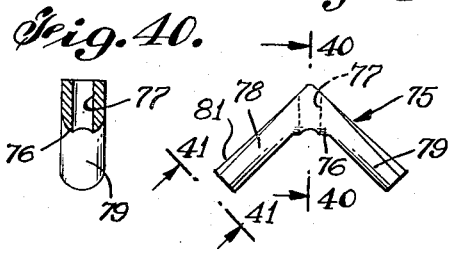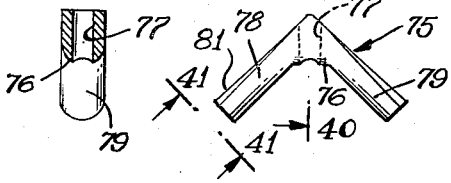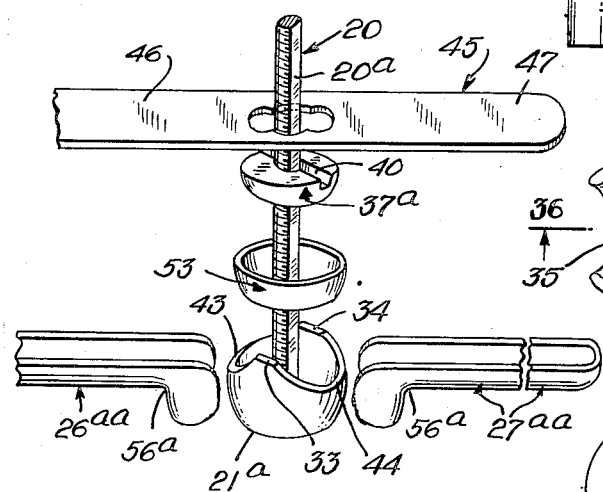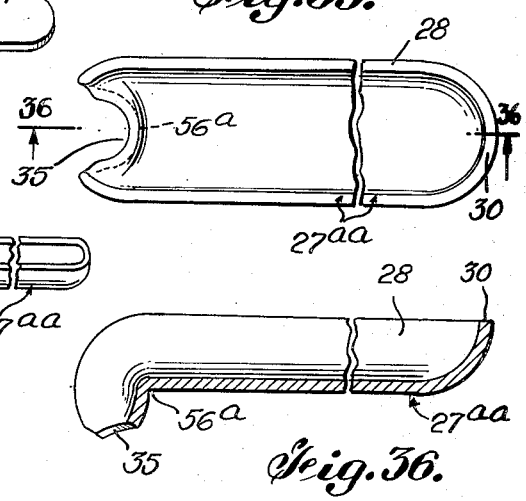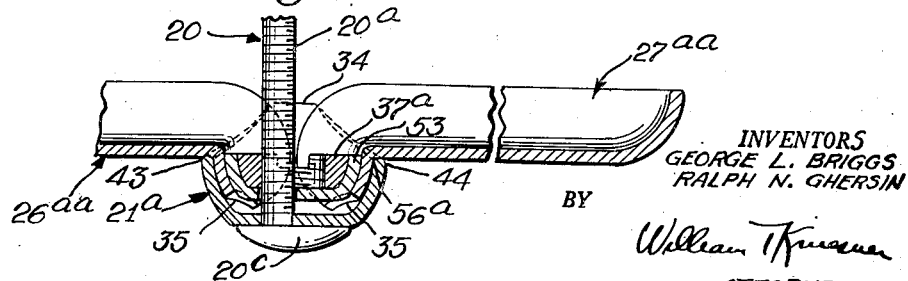

Patented Jan. 26, 1954

2,667,246

UNITED STATES PATENT OFFICE 2,667,246

MULTIANGULAR CLAMP FOR GLASS PANELS OR THE LIKE

Ralph N. Ghersin and George L. Briggs, White Plains, N. Y.

Application April 3, 1953, Serial No. 346,704

40 Claims. (Cl. 189—78)

This invention relates to constructions for securing or clamping together, at spaced intervals along their line of substantial edge-to-edge contact, of glass plates, such as the glass plates or panels of store fronts, show-cases, and the like, where a wide or substantial range of angularities between adjacent glass plates or panels are met with.

One of the objects of this invention is to provide a neat, compact and strong device for securing glass plates together in substantially edge-to-edge contact and dependably hold the glass plates at their intended angle. Another object is to provide a device of the just-mentioned character constructed and operating so as to be readily and dependably set or self-accommodating to a wide range of angles between the plates to be held in edge-to-edge assembly. Another object is to provide a relatively diminutive clamping device of the above-mentioned nature that will be capable of ease and facility of adjustment or self-accommodation to various angularities between the glass plates and yet provide, throughout its range of angular accommodation, a rigid angularity in its securing action as will reliably resist tendencies of one glass plate to pivot relative to the other about the line or plane of edge-to-edge engagement of the plates.

Another object is to provide a composite device for conjointly clamping, at spaced intervals along the line of their edge-to-edge engagement, two glass plates or panels to hold them relatively rigidly at the desired angularity and capable of functioning to provide such relative rigidity of angularity throughout a substantial range of different angles met with in practice. Another object is to provide a device of the just-mentioned nature that will be simple and easy to set or accommodate to various angularities between the glass panels and that can be readily and inexpensively installed or applied, at spaced intervals as aforesaid, in installing glass plates or panels at various angularities therebetween according to the particular requirements or conditions met with in practice. Another object is to provide a device of the just mentioned nature in which the various coacting clamping parts and other elements can be readily and inexpensively fabricated, with the parts so constructed as to assure simple and foolproof assembly as well as simplicity and ease of manipulation in installation.

Another object is to provide a device of the above-mentioned character that can be readily fabricated in forms of neat and attractive appearance, unobtrusive in size, and thus aid in achieving high quality of appearance of the store front, show-case or the like, and yet be strong and dependable in its action in mechanically maintaining substantially rigid the selected one of a substantial range of angularities throughout which the device is capable of functioning in edge-to-edge mating relation.

Another object is in general to provide improved clamping devices for securing and holding, at their apex, angularly related glass plates or panels; other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the claims.

In the accompanying drawings, in which are shown several of the various possible embodiments of our invention and in which similar reference characters refer to similar parts throughout the several views, Figure 1 is a small-scale front perspective view of a clamping device shown in relation to two glass plates or panels, showing the appearance and illustrating the functioning of the device where the external angle made by the glass panels is greater than 180°;

Figure 2 is a perspective view of the device and glass panels as seen from the rear of Figure 1;

Figure 3 is an exploded perspective view showing the several parts and their interrelationships, of the device of Figures 1 and 2;

Figure 4 is a plan view of one of the external or front clamping parts as seen along the line 4—4 of Figure 3;

Figure 5 is a transverse sectional view as seen along the line 5—5 of Figure 4;

Figure 6 is a plan view seen along the line 6—6 of Figure 3;

Figure 7 is a plan view as seen along the line 7—7 of Figure 3 but showing the several parts nested together to more clearly bring out certain features of assembly and coaction in use;

Figure 8 is a perspective view of a sleeve type of wrench for manipulating or setting one of the parts of the clamping device;

Figure 9 is an exploded perspective view of the device of Figures 1–7 showing certain coacting structural features that are preferably embodied therein when the threaded tension element or rod is made half round instead of round as in Figures 2 and 3;

Figure 10 is a plan view as seen along the line 10—10 of Figure 9 but showing the several parts nested together to more clearly bring out certain features of assembly and coaction in use.

Figure 11 is a detached or fragmentary sectional view, on a larger scale, showing the relationship of certain of the nested parts of Figure 10;

Figure 12 is an exploded perspective view like that of Figure 9 showing a modified form of certain features of the clamping device;

Figure 13 is a fragmtentary longitudinal sectional view of one of the external clamping parts as seen along the line 13—13 of Figure 12;

Figure 14 is a transverse sectional view thereof as seen along the line 14—14 of Figure 12;

Figure 15 is a view like that of Figure 13 but showing the clamping part associated with a fulcrum member;

Figure 16 is a small-scale front perspective view like that shown in Figure 1, showing how the several illustrative forms other than that of Figures 1 and 3 appear when installed and in use;

Figure 17 is a small-scale perspective view like that of Figure 2 showing how the various embodiments that employ a half round threaded tension rod appear, as from the rear in Figure 16, when installed and in use;

Figure 18 is an exploded perspective view like that of Figure 9 showing another modified form of certain features of the clamping device;

Figure 19 is a plan view or elevation of one of the clamping parts as seen along the line 19—19 of Figure 18;

Figure 20 is an end elevation as seen along the line 20—20 of Figure 19;

Figure 21 is a plan view as seen along the line 21—21 of Figure 18 but showing certain of the parts nested together;

Figure 22 is a small-scale front perspective view like that of Figure 1 but showing another form of clamping device;

Figure 23 is a perspective view as seen from the rear of Figure 22;

Figure 24 is an exploded perspective view, showing the parts and their relationship, of the device of Figures 22 and 23;

Figure 25 is a small-scale plan view or elevation as seen along the line 25—25 of Figure 24, of a dual front clamping part;

Figure 26 is an enlarged cross-sectional view as seen along the line 26—26 of Figure 25;

Figure 27 is a plan view as or elevation as seen along the line 27—27 of Figure 24, but showing certain parts nested together as in actual use;

Figure 28 is a plan view or elevation as seen along the line 28—28 of Figure 24, but showing the several parts nested together as in actual use;

Figure 29 is a detached plan view or elevation of the hollow fulcrum member, with certain parts thereof broken away, showing certain features which may be embodied in the bottom part of the fulcrum for coaction in securing a round threaded tension rod thereto;

Figure 30 is a transverse central sectional view thereof as seen along the axis Y—Y, with a round tension rod assembled thereto;

Figure 31 is a detached plan view or elevation of the hollow fulcrum member, with certain parts thereof broken away, showing certain features which may be embodied in the bottom part of the fulcrum for coaction in securing a half-round threaded tension rod thereto; and Figure 32 is a transverse central sectional view thereof as seen along the axis Y—Y, with a half-round tension rod assembled thereto.

Figure 33 is a plan or elevation showing two glass panels making an external angle that is re-entrant and relatively small, on the order of 90°, showing how the devices of this invention can function to meet such a requirement and also one form of filler and cushioning element;

Figures 34 is a view like that of Figure 12, showing a modification thereof to function also at a small external re-entrant angle;

Figure 35 is a plan view or elevation of one of the clamping parts as seen along line 35—35 of Figure 34;

Figure 36 is a longitudinal sectional view thereof as seen along the line 36—36 of Figure 35;

Figure 37 is a central vertical sectional view of the device of Figure 34 showing its parts in positions corresponding to one limit of setting of the angularity between the front clamping parts;

Figure 38 is a top view, in relation to Figure 33, of a protective or sealing member coacting with the panels and parts of the front clamping members;

Figure 39 is a front elevation thereof;

Figure 40 is a transverse section on line 40—40 of Figure 39, and

Figure 41 is an elevation of one end thereof.

As conducive to a clearer understanding of certain features of this invention it might be pointed out that in the construction of store fronts and the like large glass plates or panels are frequently set at angles to each other with the contiguous edges of the glass plates appropriately beveled or mitered to bring them into substantial edge-to-edge contact, frequently with a very small space between the edge faces, for the reception of a suitable cement or caulking compound, which, however, is to the eye substantially invisible; according to prior practice such installations meet with various limitations or disadvantages or handicaps. For example, such glass panels have to be secured in some manner at spaced points along the edge-to-edge junction so as not to obscure the all-glass visual effect of the angular junction, and frequently the angle or angles at which two glass plates can be set are limited by the fixed angularities of available clamping devices, and even at that any installational departure from a given available angularity in setting up the glass panels brings about detrimental stresses and strains when the clamping devices of fixed angularity are applied at the corner-like junction. With fixed-angled clamping devices the installer of angularly related glass panels has to carry in stock suitable quantities of differently angular clamping devices in order to meet limited variations in angles met with in practice. One of the dominant aims of this invention is to provide a clamping device capable of ready setting or adjusting to clamp edge-to-edge panels at any angle within a wide range of angularities and still achieve rigidity of any selected angle so that, among other advantages, the installer need not be burdened by a large stock of differently angular devices, as heretofore.

In the drawings are shown two glass plates A, B, set in substantially edge-to-edge contact at an angle to each other, as for a store front, showcase or the like, and from the viewpoint of appearance it is the outside or external angle, indicated at C in Figure 1, that is of principal importance, particularly from the viewpoint of appearance, and that external angle C is usually a large angle, leaving an internal angle, indicated at D in Figures 1 and 2, that is usually the smaller of the two and, being on the inside, is of less importance from the viewpoint of appearance, though any elements of the clamping device exposed to view should nevertheless be unobtrusive in appearance. These relative angles may vary throughout substantial ranges, as is later pointed out, and those shown in the drawings are of course only illustrative. Whatever the angle, the adjacent and usually vertical edges of the two glass panels are desirably ground or shaped, as by beveling or mitering, to present parallel edge faces E, F, which are parallel to the bisector of the angle C and of the angle D, thus providing mating edge faces which are for practical purposes in substantial face-to-face abutment even though in installing them a slight spacing is provided which is filled in, to make the juncture airtight and weathertight, with any suitable cement or caulking compound; in the drawings the line or plane of junction or abutment, indicated at J, may be considered to be or to include such a thin layer of cement or caulking compound where the latter is employed.

At spaced intervals along the apex or junction clamping devices are employed, and in Figures 1 and 2 one form of such clamping device is shown in perspective at one such spaced point along the apex formed by the two angularly related glass panels A, B, and it is constructed so that its pairs of clamping elements, one pair for each glass panel, can be set or adjusted, while maintaining rigidity of angularity, to any angle within the above noted range of change of the external angle C.

The clamping device comprises a threaded tension rod 20 which is to pass through the junction J of the two glass panels A, B, and its longitudinal axis is to fall in the plane or line of the bisector of the external angle C and internal angle D, and for this purpose there is ground into either or both of the edge faces E, F a transverse recess or groove of appropriate shape and direction. For example, the tension rod 20 may be of round cross-section, in which case a transverse half-circular groove is cut into each of the faces E, F, the two grooves together, when the glass panels A, B are set in position, forming a round hole into which the threaded round stem neatly passes, thus aiding in substantially aligning the rod 20 with the above-mentioned bisector. Or, as is shown in Figure 17 of the drawings, the threaded tension rod 20 may be half round, having a flat face 20ª, in which case it can be aligned by and accommodated in a single half circular groove cut into the edge face of one of the two plates, such as the plate A in Figure 17, that groove being closed over by the uncut edge face E of the companion glass panel B, which thus can serve to key or hold the half-round rod 20 against rotation about its axis.

At that end of the tension rod that projects forwardly (Figure 1) through the apex and along the bisector of the external angle C, being the lower end as seen in Figure 3, is secured, in any suitable manner, a relatively small hollow fulcrum member 21 which, though coacting with other parts about to be described, can be given an external shape that is pleasing or ornamental, illustratively and preferably shaped somewhat like a truncated spheroid, presenting external curved or convexed surfaces, as indicated in perspective in Figure 1. It suggests, in appearance, a relatively small but neat dome-like structure.

More specifically and as will be seen from Figures 1, 3 and 6, it has a somewhat cylindrical side wall 22 closed over at its outer end by a truncated spherical end or bottom wall 23, to which, and coaxially with which, the tension rod 20 is connected or secured and, where the rod is half round, it is preferably also oriented, as is later described, with respect to certain parts of the fulcrum member.

Referring to Figure 6, the fulcrum member 21 may be considered as having two axes at right angles to each other, namely, the axis X—X and the axis Y—Y, intersecting at the coincident axes of the rod 20 and the truncated spherical end wall 23. Projecting upwardly and inwardly from opposite sides of the side wall 22, being aligned along the axis Y—Y, are two lugs or ears 24, 25, being integrally formed with cylindrical side wall 22.

These inwardly bent hook-like lugs 24, 25 coact as holding or securing elements for two identical clamping parts 26, 27, external portions of which are to engage against the front or external faces of the glass panels A, B respectively as shown in Figure 1, being for convenience hereinafter referred to as "front" clamping parts or elements, while portions thereof internal of the fulcrum member are to serve as short lever arms. Parts 26, 27 are identical and interchangeable and it will suffice to describe one of them in detail. Referring to Figures 3, 4 and 5, member 27 is preferably constructed to be hollow, and it may be in the form of a stamping or casting. Conveniently it is, in transverse cross section (Figure 5), concavo-convex. It has geometrically parallel inside and outside faces 28, 29 that are surfaces of revolution of different radii, each of about 180° extent (see Figure 5); it thus has very substantial strength and good resistance to strain or distortion, being additionally reinforced by an end closure wall 30, which externally, as is better seen in Figure 1, is curved or convexed neatly and attractively to merge the half cylindrical outer face 29 into the plane of the front face of the glass panel.

Near its other end but substantially spaced therefrom, the member 27 has a generally rectangular hole 32 aligned along the longitudinal axis of the clamping element (see Figures 4 and 3), being dimensioned to relatively snugly receive therein one of the hook-shaped lugs 24 or 25 of the fulcrum member 21. The radius of curvature of the outer face 29 is just about equal to the radius of curvature of the inside face of the generally cylindrical wall 22 of the fulcrum member 21 so that, viewing Figure 3, by substantially upending the two front clamping devices 26, 27 their lower ends can be entered into the hollow of the fulcrum member 21, each on one side of the axis X—X of Figure 6 and hence each to one side of the upstanding tension rod 20, until their respective rectangular holes 32 are brought into juxtaposition with the hook-shaped lugs 24, 25 for the latter to be entered into the holes and thus assembling the clamping members 26, 27 to the fulcrum member 21.

The lugs 24, 25, coacting with the holes 32 in the clamping parts 26, 27, aid in alining the two clamping parts along and with the axis Y—Y of Figure 6, but coacting therewith are the upstanding opposed parts 33, 34 of the fulcrum member 24 between which the inner ends of the clamping parts 26, 27 are snugly received because of the above-described relative proportioning of the radii. Such alinement of the clamping parts along and with the axis Y—Y, Figure 6, takes place throughout a substantial angle of swing of each clamping member in directions toward and away from parallelism with the tension rod 20 itself, for example, from an almost upright position, as viewed in Figure 3, of each clamping member 26, 27, each to one side of the tension rod 20, to a position where each clamping member slants downwardly below a horizontal plane through the lugs 24, 25. That gives each clamping member 26, 27 a range of swing of over 90° in a direction downwardly and outwardly from the tension rod 20, and in any position within that range of swing the members are held with their longitudinal axes always in the same vertical plane, a plane coincident with the axis Y—Y of the fulcrum member 21 (see Figure 6). Members 26, 27 can thus be accommodated to a wide range of angularity for angle D, as from somewhat less than 180° to about 315° or so.

The inner ends of the clamping members 26, 27, when both of the latter are horizontal as viewed in Figure 3, terminate in close proximity to each other and almost contact each other to either side of the threaded tension rod 20, being provided with a slot-like arcuate cutout 35 (see Figure 4) of a radius commensurate with the radius of the tension rod 20 so as to accommodate the latter therein as the parts 26, 27 assume various angular positions. Moreover, the inner ends of the two clamping members 26, 27, instead of being squared off, have their arcuate side walls cut off in a gradual curve or arc as at 36, without disturbing the radius of curvature of the inner face 28, so as to provide a good seat for a cam nut 37 threaded onto the threaded rod 20. Cam nut 37, as shown in Figure 3, is in effect a half-sphere, thereby providing a cam face 38 that has a radius of curvature equal to the radius of curvature of the inner face 28 of the two clamping parts, and in its upper flat face it is provided with a cross slot 40 to receive the prongs 41 of a sleeve wrench 42 (see Figure 8) which can be sleeved onto the rod 20 to turn the cam nut 37 when setting the latter to set the front clamping parts 26, 27 to whatever is the external angle C formed by the glass plates A, B (Figure 1). The diameter of cam nut 37 is less than the space between the inner ends of the hooked lugs 24, 25 so that the latter will not interfere with downward movement and entry of the cam nut 37 into the fulcrum member 21.

With the clamping parts 26, 27 hooked onto the lugs 24, 25 respectively of the fulcrum member 21, threading the cam nut 37 downwardly enters it into and interfits it snugly with those portions of the clamping members that extend inwardly from the holes 32, causing those portions to serve as lever arms to set and fix the angularities of members 26, 27. The hemispherical cam face 38 of the cam nut 37 confines the opposed inwardly curved sides of the clamping parts 26, 27 between itself and the opposed upstanding parts 33, 34 of the hollow fulcrum member 21 and thus these parts coact to prevent detrimental side sway or wobble of the two clamping parts, holding them with their longitudinal axes in the vertical plane through the axis Y—Y of Figure 7. Moreover, to either side of each lug 24, 25 the upper edge of the circular side wall 22 of the fulcrum member 21 is curved in an upwardly concave sense, for example, at a radius slightly larger than the radius of curvature of the external face 29 of the clamping member, as shown at 43—43 adjacent the lug 24 and at 44—44 adjacent the lug 25. The curved edges 43—43 form a fulcrum against which clamping part 26 rests and about which it may tilt and the curved edges 44—44 form a fulcrum against which the clamping part 27 rests and about which it may tilt, each throughout the range above described and under the control of their respective lever arm portions coacting with nut 37.

With the aid of sleeve wrench 42 cam nut 37 is rotated to the desired position downwardly into the hollow of the fulcrum member 21, acting equally upon the adjacent inner end lever arm portions of the two clamping parts 26, 27 to give each the same angle of tilt relative to the axis of the tension member 20, with the sum of the two angles equal to the external angle C at which the glass panels A, B are set. An illustrative range of values for angle C may comprise from about 160° to about 315°. In so setting the equal angularities of the outer clamping parts 26, 27 under the control of the cam nut 37, the clamping members 26, 27 function in effect as levers of the first class, the cam nut simultaneously applying the setting force to each at the outer end of a lever arm that comprises that portion of the clamping member that projects from the fulcrum edge of the fulcrum member 21 towards the threaded tension rod 20; this is not only a force applied in equally setting the angles of the two clamping parts but also is in effect a holding or securing force that permits each clamping part 26, 27 to function as a rigid cantilever in so far as applying clamping action on the panels is concerned. Neither the angle between clamping part 26 and rod 20 nor the angle between the clamping part 27 and the rod 20 can be enlarged by force applied at the outermost ends of the clamping parts 26, 27, and with rod 20 under tension, as later set forth, the angle C to which the clamping parts 26, 27 are adjusted or set becomes a rigid angle as a whole and furthermore its two halves are likewise rigid.

With the parts 26, 40 and 27 thus assembled and adjusted relative to the fulcrum member 21 and the threaded rod 20, the rod 20 is entered through the ground or cut groove or grooves at the junction J, the rod moving along the bisector of the angle D and bringing the flat or plane edge faces of the outer clamping parts 26, 27 flatwise against the outer faces of the glass panels A, B respectively, as shown in Figure 1, the fixed angle subtended by the clamping parts 26, 27 neatly mating with the angle C formed by the outer faces of the glass plates, thus also neatly aligning the clamping parts 26, 27 crosswise of the apex of the edge-to-edge junction between the glass plates. The threaded tension rod 20 projects rearwardly of the two glass plates and along the bisector of the interior angle D, as shown in Figure 2, standing ready to have coacting clamping elements associated therewith.

These coacting clamping elements comprise a unitary clamping plate 45 that is relatively narrow and long, but preferably shorter than the over-all lengths of the two outer clamping parts 26, 27 and being of about the same width as the latter. Clamping plate 45 may be in the form of a stamping of suitably heavy sheet metal and is divided into two clamping parts 46, 47 by a centrally located hole 48 (Figures 2 and 3) through which the rod 20 may pass and along the transverse axis of which the flat stamped plate 45 may be manually bent to conform to the internal angle D, as shown in Figure 2 and also in Figure 3. The hole 48 may be given any suitable outline as with four arcuate lobes, of which two are alined along the transverse bisector of the plate 45, thus to provide two transversely alined portions 45a, 45b to facilitate bending of the plate along its transverse central axis.

Having slipped the bent plate 45 onto the threaded rod 20 and into the inside angle D, thus juxtaposing the internal clamping parts 46, 47 respectively to the outer clamping parts 26, 27, with the glass plates A, B respectively therebetween, a strong rigid arcuate yoke member 50 is slipped onto the tension rod 20, the yoke 50 having a width about equal to that of the bent or angled clamping plate 45 and presenting equal and opposed arm-like portions 50a, 50b for engagement respectively with the inside clamping plates 46, 47 at some distance from the apex ends of the latter. Onto the free end of the threaded rod 20 is now threaded a clamping nut 51 and it is tightened up to put the rod 20 in appropriate tension, thus stressing the outer clamping parts 26, 27 as a unit and the inside clamping parts 46, 47 as a unit, toward each other, to clamp the glass panels A, B and fix and hold them at the angle to which the outer clamping parts 26, 27 were initially adjusted or set, that angle being the external angle C of Figure 1.

In the resultant clamping action the clamping forces applied to the outer clamping parts 26, 27 act thereon through the fulcrum edges 43—43 for clamping part 26 and fulcrum edges 44—44 for the clamping part 27, but because the hemispherical cam nut 37 snugly mates, as above described, with the curvatures of the inside faces 28 of the clamping parts 26, 27 and at the inner ends thereof, the two outer clamping parts 26, 27 function virtually as rigid cantilevers making a fixed angle with each other and fixed angles with the threaded tension rod 20; under the equalized stresses applied to the inside plates 46, 47 by the balancing or equalizing yoke 50, the inside or back clamping plates 46, 47 are neatly and dependably pressed against the inside faces of the glass panels A, B and held in substantial parallelism with their respectively juxtaposed or front clamping parts 26, 27. Also, the equalizer yoke 50, which has a hole 50c in which the tension rod 20 snugly but slidably fits, can act, through its opposed arm-like parts 50a, 50b, as a double-acting brace to steady the inside end of the threaded rod 20 and aid in holding it along the bisector of the angle and against stresses that might tend to shift it out of coincidence with the bisector. These actions are aided by the rigid portions 45a and 45b (Figure 3) which connect the two back plates 46 and hold them in nice alignment with each other and against relative displacement. The part 50 can thus coact in maintaining the rigidity of the angle at which the outer clamping parts 26, 27 are set by the cam nut 37 and the fulcrum edges as above described.

The device can be embodied in relatively diminutive form; for example, the hollow-fulcrum member 21 (Figures 1, 3 and 7) can have a diameter on the order of $\frac{7}{8}$ of an inch; the half round front clamping parts 26, 27 can have an over-all width or outside diameter somewhat less, being about the same as, or a little less than, the inside diameter of fulcrum member 21, so that their inner ends enter, with appropriate small clearance, between the side parts 33 and 34 and into the interior of the hollow fulcrum member 21. And as above noted, the radius of the cam face 38 of cam nut 37 is just about equal to the radius of the inside faces 28 of the clamping parts 26, 27 for snug interfitting with the inner end portions of the clamping parts. Thus, as is better shown in Figure 7, these various parts are snugly and neatly nested one within another, making for avoidance of undesirable looseness or play and coacting to reinforce one another mutually throughout the range of adjustment or seating of the parts according to the size of the external angle C (Figure 1) and thus providing a strongly reinforced structure at whatever angle for which the parts are set. The construction, though diminutive, is strong, the interactions of its parts making it in effect self-reinforcing. As appears from Figure 1, the device when installed makes a neat appearance, being symmetrical about the apex of the external angle C, while the parts on the inside, as shown in Figure 2, are also relatively small and are unobtrusive in appearance.

In Figure 3 the threaded rod 20 is purposely shown of exaggerated length in order better to bring out the relationships between the various parts. The hollow fulcrum member 21 may be fabricated in any suitable manner; for example, it may be made of sheet metal by suitable stamping and drawing operations.

Our invention may be carried out in other forms than the embodiment illustratively described above, and several such other possible forms are later herein described by way of examples but not by way of limitation; moreover, all of them can be carried out in practice by making the threaded rod 20 half round, as already suggested above, where it is desired to gain the advantage of having to cut or grind a transverse half-circular groove into the edge face of only one of the glass plates A, B, such as the plate A of Figure 17. In Figures 9–11 we have shown the form above described in connection with Figures 1–7 modified to employ a half round threaded rod 20, its flat face being designated by the reference character 20a. Its lower end is suitably secured coaxially to the fulcrum member 21 but with the flat face 20a thereof oriented so that its plane coincides with the axis X—X of the fulcrum member 21 (see Figure 10) and extends at right angles to the axis Y—Y. This orientation, which is also an orientation relative to the hook-shaped parts 24—25 and to the opposed upward extensions 33, 34, thus brings the vertical plane (Figure 9) in which the longitudinal center lines of the front clamping parts 26, 27 move as their angularities are changed, at right angles to the flat face 20a which that plane bisects along its own vertical center line. Accordingly, when the half round rod 20 is entered through the half round transverse groove cut into glass plate A, that groove being closed over by the edge face F of the companion glass plate B, this edge face F, being vertical in the illustration of Figure 17, causes the flat face 20a of the threaded rod 20 to fall in a vertical plane, in effect keying the half round rod 20 against rotation about its axis, and thus the front clamping parts 26, 27 are brought up against the outer or front faces of the glass plates A, B with their center lines falling in a plane at right angles to the apex of the angle formed by the two glass plates. And as shown in Figure 9, the hole 50c in the equalizer yoke 50 is preferably also half round to interfit with the half round tension rod 20 and thus align the longitudinal center line of the yoke arms 50b, 50a in a plane at right angles to the just mentioned apex. Thereby also the yoke 50 cannot turn about the axis of threaded rod 20, and it is thus easy to align the arms of the bent back clamping plate 45 with the respective arms of the equalizer yoke 50.

Inasmuch as the clamping nut 37 (Figure 9) acts upon relatively short lever arms of the front clamping parts 26, 27, being those portions of the latter that overhang the fulcrum member 21 interiorly, the reactions upon the cam nut 37 may be substantial when the length of these short lever arms is compared with the over-all lengths of the front clamping parts 26, 27 themselves, and to insure good and relatively tight interfitting of the inside threads of the cam nut 37 with the threads of the half round tension rod 20, the former being of 360° extent and the latter of only 180° extent, we make provision for dependably holding the half round rod 20 and the nut 37 coaxially and against such tendency for relative radial shift therebetween as might be permitted because of the substantially half round cross section of the rod.

For this purpose the radius of the half spherical nut 37ª in Figure 9 is made less than the radius of the nut 37 in Figure 3 by an amount equal to the thickness of the sheet metal of a shell 53 (Figures 9, 10 and 11), which is substantially a hollow half sphere with the radius of its outer spherical surface substantially equal to the radius of the inside faces 28 of the front clamping parts 26, 27, thus providing an interfitting action with the latter the same as that of the cam nut 37 of Figure 3 as earlier above described. Cam nut 37ª fits snugly within the shell 53, and the latter has a flat circular bottom 53ª which closes over the lower end of the threaded hole in the nut 37ª excepting for a semi-circular aperture 53ᵇ that provides a straight edge face 53ᶜ that extends along a diameter of the threaded nut hole, the radius of its half circular edge being substantially equal to the radius of the half round threaded rod 20 so that the latter can and does pass through the semi-circular opening 53ᵇ with its flat face 20ª engaging the diametrical edge face 53ᶜ of the shell 53 and in effect holding the half round threads on the rod 20 always snugly interengaged with and seated in the internal threads of the nut.

With this arrangement, and as better appears from Figures 9, 10 and 11, the several parts are seated or nested one within another for mutual sustaining and reinforcing action; the inner ends of the front clamping parts 26, 27 are snugly received between the upstanding opposed parts 33, 34 of the fulcrum member 21, the shell 53 nests within these inner ends of the clamping parts 26, 27 with its external convexed cam surface substantially interfitted with the internally concaved faces of the clamping parts, being keyed or held against rotation by the manner in which, as above described, the half round rod 20 interfits with the semi-circular aperture 53ᵇ in the bottom of the shell 53, and the nut 37ª is snugly fitted and nested within the shell 53 itself. Here see also Figure 10. The nut 37ª has a cross slot 40, as does the nut 37 of the form of Figure 3, to receive the prongs 41 of the sleeve wrench 42 (see Figure 8) to turn the nut 37ª to seat the front clamping parts 26, 27 to their respective and equal angles relative to the axis of the tension rod 20, in the manner earlier above described. The shell 53 closes off the outer ends of the cross slot 40 in the nut 37ª, the diameter of the sleeve wrench 42 of Figure 8 being appropriately less than the inside diameter of shell 53 and accordingly, the sleeve wrench cannot become interengaged with the cup 53 itself but only with the nut 37ª. As the nut 37ª is turned to move it up or down along the half round threaded rod 20 (Figure 9) the same lever action of the clamping parts 26, 27 about the fulcrum edges 43—43, 44, 44 takes place as earlier above described except that in the form of Figure 9 the rotating nut 37ª acts upon the short lever arms through the non-rotating shell 53, which acts through its diametrical cross edge 53ᶜ to maintain threaded rod and nut in sound interengagement and in coaxial alignment; thereby insuring that the full strength of the interengaged threads, particularly those on the half round rod, is available to transmit stresses without damage to the threads and, in maintaining nut and threaded half round rod coaxially, providing for equal effects on the inner ends of the clamping parts 26, 27 to set each one to the same angle to the vertical axis of the rod 20. The nesting of the several parts as above described, particularly when the parts are under stress, coacts to insure maintenance of coaxial relationship between shell 53 and nut 37ª, as at the mating spherical surfaces of the two parts.

As above noted, our invention may be carried out in other forms, all operable according to the principles above disclosed; several modifications are about to be described and it will be understood that, though they are described in connection with the use of a half round threaded tension rod, utilizing a nut 37ª and coacting shell 53 as just described in connection with Figures 9–11, this is not intended by way of limitation.

Referring first to Figure 12, at the lower end of the threaded tension rod 20 there is a fulcrum member 21ª which is substantially the same as the member 21 of Figures 1–11 excepting that it is devoid of the opposed hook-shaped parts 24, 25 so that the curved or arcuate fulcrum edges 43—43 on one side and 44—44 on the other side are respectively continuous, as indicated at 43ª, 44ª, the remaining portions of the fulcrum member 21ª being identified by the same reference characters as the corresponding parts in Figures 1–11. The outer or front clamping parts, in Figure 12, are indicated at 26ª, 27ª, and they are the same as the parts 26, 27 of Figures 1–11 except that at their inner ends they are not provided with the holes 32 and instead they are provided each with a depressed portion 55 that extends from the cut-out 35 and along the longitudinal center line of each throughout a distance materially less than the inside radius of the cylindrical wall 22 of the fulcrum member 21ª. The portion 55 forms an external bulge which is of materially lesser peripheral extent than that of the clamping part itself (see Figure 14) so as to leave to either side thereof, as is better shown in Figure 14, substantial arcuate extents of the inside face 28 for engagement and nesting thereagainst of a nut like the nut 37 of Figure 3 or the shell 53, as indicated in Figure 12, with the nut 37ª nested in the shell. In direction lengthwise of the front clamping part the bulge 55, as is better shown in Figure 13, curves somewhat gradually into the outer face 29 of the clamping part, but does so to form an angularity with the face 29, as indicated at 56 in Figure 13. The front clamping parts 26ª, 27ª are assembled to the fulcrum member 21ª by resting their adjacent ends as viewed in Figure 12 onto the respective curved edge seats 43ª, 44ª, but with the bulges 55 of each overhanging the fulcrum member 21ª interiorly, as is better shown in Figure 15, the respective angularities 56 forming in effect external seats or locators for fixing the point about which each clamping part 26ª, 27ª is to pivot with the edge faces 43ª, 44ª serving as fulcrum edges for coaction with the external faces 29. These external bulges 55 thus serve to hold the clamping parts 26ª, 27ª against movement outwardly away from the hollow fulcrum member 21ª, throughout their range of swing or adjustment to the external angle C of the glass plates A, B. Due to the interfitting and nesting of the parts and the coaction between the nut and the fulcrum member, the clamping parts 26ª, 27ª are held assembled and against dislodgment out of their respectively adjusted equi-angular positions; the bulge 55 in each precluding withdrawal of either clamping part endwise out from inbetween its companion nested parts. The nested relationship of the construction of Figures 12–15 appears substantially the same as shown in Figure 10, omitting therefrom the hook-shaped parts 24, 25 and the holes 32. When installed the device appears from the front as shown in Figure 16, appearing much the same as that of Figure 1 excepting that the hook-shaped members 24, 25 of the latter figure are absent in Figure 16, and the device appears, as seen from the inside, substantially the same as shown in Figure 2 when a round threaded rod 20 is employed, or as seen in Figure 17 when a half round tension rod is employed.

Referring now to Figures 18–21, the modification therein shown is in all material respects the same as that of Figure 12 excepting that the inner ends of the front clamping parts are differently shaped for assembly and coaction with the cam nut whether the latter coacts directly therewith like the nut 37 of Figure 3 or coacts therewith through a shell like the shell 53 related to the nut 37ª as described above; in Figures 18 and 21 parts similar to those shown in Figures 12 and 15 are identified by similar reference characters; the two front clamping elements, however, being identified in Figures 18–21 by the reference characters 26ᵇ, 27ᵇ. The latter, like those of the above described modifications, are identical in construction and are interchangeable and they can thus be made in the same process or by the same tools, as in suitable punch press operations.

At their inner ends (Figure 18) the front clamping parts 26ᵇ, 27ᵇ are shaped and cut away substantially as shown (see also Figures 19 and 20) but only throughout those inner end portions that overhang the hollow fulcrum member 21ª interiorly. Within that overhanging portion each member is cut away as at 58 along two lines or planes 59, 60, of which the former is parallel to the central vertical plane of the clamping part as along the central axis Z—Z of Figure 19, being displaced therefrom by a distance about equal to the radius of rod 20, and of which the other extends at 90° to the axis Z—Z. The two lines 59, 60 are joined in a curved line as indicated at 61 of a radius of curvature somewhat greater than the radius of the threaded tension rod 20ª, which is indicated in broken lines in Figure 19; the center of the curvature of line 61 is located on the axis Z—Z and is spaced from the extreme innermost end of the clamping part by a distance equal to or slightly less than the inside radius of the side wall 22 of the fulcrum member 21, the portions of the half-cylindrical inside and outside faces 28, 29 that are on one side of the center line Z—Z being extended and curved inwardly as indicated at 28ª, 29ª toward and up to the plane in which falls the line 59, each at its own radius with the center of these curvatures coinciding substantially with the center of curvature of the cutout 61, thus juxtaposing to the cutout 58 a quadrant 62 in which the faces 28ª, 29ª are spherical.

When the clamping parts 26ᵇ, 27ᵇ are assembled to the fulcrum member 21ª on the threaded tension rod, the partial spherical portions or quadrants 62 fall to opposite sides of the tension rod, the recesses or cutouts 61 complementing each other and forming together a hole through which the threaded rod passes with plenty of clearance, and the quadrant-like spherical portion 62 of the one clamping part becomes amply accommodated in the cutout 58 of the other clamping part, and together they just neatly fit inbetween the upstanding side parts 33, 34 of the fulcrum member 21ª and together the spherical internal faces 28ª thereof form a seat into which the shell 53 (or the nut 37 of Figure 3) neatly nests, being of the same radius of curvature. This internesting or interfitting of the parts substantially as just described is better shown in Figure 21, and these relationships of the parts are maintained throughout the range of adjustment of angularity of the clamping parts 26ᵇ, 27ᵇ as the cam nut is turned to thread it up or down with the aid of the sleeve wrench 42 coacting with the cross slot 40 in the nut. The parts are thus held assembled and against misalignment. The two clamping parts 26ᵇ—27ᵇ are always held with their center lines in the vertical plane through the axis Y—Y (see Figure 21) of the fulcrum member 21ª, and neither can be withdrawn from the assembly, for the hollow fulcrum member 21ª precludes the necessary relative transverse movement therebetween along the axis X—X of Figure 21 to effect appropriate enlargement or opening up of the seat formed by the complementary quadrants 62, 62 through which the threaded rod extends, all in coaction with the cam nut (with or without the shell 53) which holds the parts nested and, moreover, locks each clamping part against withdrawal because it is seated against the quadrant-like inner face 28ª which extends to the other side of the cam structure. As in the other forms, a wide range of angularity between the front clamping parts may be achieved, with each clamping part making the same rigid angle to the axis of the threaded tension rod; for example, the front clamping parts 26ᵇ, 27ᵇ of Figure 18 may be accommodated to angularities corresponding to values for the external angle C of Figure 16 from about 160° to about 315° or less, that being an illustrative range throughout which the above described parts coact in maintaining the assembly and alignments and angularities as just noted. Moreover, the flat or plane edge faces throughout which the front clamping parts 26ᵇ, 27ᵇ engage the front faces of the glass panels A, B transmit to and distribute throughout substantial areas of the two glass panels the clamping pressures which are transmitted to the front clamping parts through the fulcrum seats or edges 43ª, 44ª respectively of the hollow fulcrum member 21ª, the latter thus pressing the clamping parts flatwise against the glass panels and thus aiding in maintaining the alignments of the front clamping parts as above described. The front clamping parts are thus dependably aligned with each other and also maintained juxtaposed to and aligned with the back clamping parts 46, 47 respectively, to which pressure is applied for distribution to the inside faces of the glass panels by the respective arms of the equalizer member 50, as earlier above described.

Referring now to Figures 22-27, we have there shown another illustrative modification or embodiment by which many features and advantages of our invention may be achieved, and though there shown in connection with a threaded half round tension rod 20 and cam nut 37ª with coacting centering shell 53, it will be understood that this embodiment may be carried out in practice where the tension rod is full round and cam nut like nut 37 of Figure 3 may be employed without utilizing the centering shell 53. In Figures 22-28 the front clamping members are indicated by the reference characters 26°, 27°, and they are formed out of a single or unitary piece of suitably ductile metal, out of which they may be formed in any suitable manner, as by casting or, preferably, as by stamping out of suitable sheet metal stock.

Each front clamping part 26°, 27° is preferably hollow as in the other forms above described, being preferably concavo-convex in cross section (see Figure 26) and they may be arcuate, conveniently of 180° extent; thus each has an inside concave face 28 and an external convex face 29 and each is closed off at its outer end, as at 30, all as earlier above described in connection with the other embodiments.

The unitary casting or stamping that comprises the just described front clamping parts 26, 27 is provided, at its center, which is the intersection of its central longitudinal and transverse axes (see Figure 25), with a round hole 65 of a radius equal to the maximum radius of the threaded tension rod 20 so that the latter, whether full round or half round, can neatly extend therethrough with its axis coincident with the center of the hole. With the threaded rod so passed through hole 65, the upstanding side portions 33, 34 of the fulcrum member 21ª, being the same as that described above in connection with Figures 12 and 18, just snugly receive therebetween the longitudinal sides of the unitary straight structure 26°—27° as the latter is brought to rest with portions of the external arcuate faces 29, 29 of the two clamping parts 26°, 27° adjacent the hole 65 brought to rest respectively against the upwardly concaved fulcrum edges 43ª, 44ª of the fulcrum member 21ª, as indicated in full lines in Figure 28; thereby the straight unitary structure 26°—27° becomes aligned relative to the fulcrum member 21ª, its longitudinal axis becoming aligned with the axis Y—Y of the fulcrum member 21ª and its central transverse axis becoming aligned with the axis X—X (Figure 28).

As appears better from Figures 24, 25, 26, to each side of the longitudinal axis and aligned with the transverse axis, we provide slot-like diametrically opposed cutouts or extensions 66, 67 of the hole 65; these slots extend along the plane of the central transverse axis of the unitary member 26°—27°, following along the arcuate cross-sectional curvature (see Figure 26), and they terminate adjacent to but spaced from the plane of the continuous peripheral back edge, leaving appropriate thicknesses of metal adjacent opposite longitudinal back edges to form bendable bridges 68, 69 respectively, each being of a cross section, as is better shown in Figure 26, to provide ease of bending, without tearing or rupturing the texture of the metal of the bridges, about a central transverse axis closely adjacent to the plane of the continuous peripheral back edge of the unitary device 26°—27°. Preferably, the outer ends of slots 66, 67 are rounded, as is indicated in Figure 24, to facilitate bending in either direction about the just stated axis without tearing or rupturing the texture of the metal.

At whatever the angle C (Figure 22) to which the front clamping parts 26°, 27° (Figure 24) are set, illustratively within the illustrative range or ranges above mentioned, by bending at the bridging parts 68, 69 (an illustrative bend, where the angle C is greater than 180°, is indicated in broken lines in Figure 24), portions of the inside arcuate faces 28, 28 of the two clamping parts 26°, 27° are presented upwardly, to each side of the axis of bending, for bearing engagement with the cam nut 37, as in Figure 3, where the tension rod 20 is full round, or with the shell 53 (Figure 24), where the tension rod is half round and nut 37ª and shell 53 are employed for advantages and coactions as earlier above described, and by applying the sleeve wrench 42 (Figure 8) to the nut to turn the latter on the threaded tension rod, each front clamping part 26°, 27° may be set to the same angle to the axis of the threaded rod with the sum of the two angles equal to the desired value of the external angle C. The nut, directly as in Figure 3 or indirectly through the shell 53 as in Figure 24, can be made, by threading it downwardly, to exert upon the inner ends of the clamping parts 26°, 27° appropriate forces to depress these inner ends about the uppwardly concave or arcuate edges 43ª, 44ª respectively of the hollow fulcrum member 21ª, these edges serving as fulcrums about which the clamping parts 26°, 27° are tilted upwardly in the same increments of angularity per increment of downward movement of the nut, the latter thus operating, through lever-like action, to effect bending at the bendable bridging portions, 68, 69. Or the bending, to the desired angularity, may be effected manually, also when the angle C is somewhat less than 180° and the direction of bending is downwardly as viewed in Figure 24, it being noted, in this latter connection, that the width of the slot-like extensions or cutouts 66, 67 is selected to permit a suitable degree of such downward or reverse bending, and in such case the hole 65 is correspondingly elongated in the direction of the longitudinal axis of the parts 26°, 27°. Whatever the range of bending provided, the vertical dimension or height of the diametrically opposed side parts 33, 34 of the fulcrum member 21ª, in relation to the upwardly concave fulcrum edges 43ª, 44ª, is sufficient so that the apex of the angle of bending, being formed by the bent bridge parts 68, 69, falls below the top edges of these side portions 33, 34, thus maintaining a substantially nested relation of the bent member 26°—27° with the hollow fulcrum member 21ª, with the nut (with or without the shell 53) in turn nested against the inside faces 28 for equalized abutting or holding action upon the inner ends of the two clamping parts 26°, 27°, thus to rigidly hold the latter against enlargement of the equal angles which they make with the axis of the threaded tension rod 20.

When installed, as shown in Figures 22 and 23, the just described relationship of the parts, including the holding action of the cam nut on the inner lever arm ends of the clamping parts 26°, 27°, aids in maintaining rigidity of the just-mentioned equal angles and in causing each front clamping part 26ᶜ, 27ᶜ to function somewhat like rigid cantilevers; the latter apply and distribute to the clamping pressures or forces to the front faces of the glass panels, through the back edges of the clamping parts which rest flatwise against the panels. These clamping pressures are transmitted to the front clamping parts through the concaved fulcrum edges 43ᵃ, 44ᵃ of the hollow fulcrum member 21ᵃ with which the external curved or convex faces 29, 29 of the clamping parts engage, also resulting, as in the other forms, in achieving and maintaining good seating of the various parts. All of these actions are furthermore aided by the relatively rigid junctions which the bent bridge parts 68, 69 form between the two front clamping parts 26ᶜ, 27ᶜ; these junctions contribute toward holding the longitudinal axes of the clamping parts 26ᶜ, 27ᶜ in alignment with each other and coact with the side portions 33, 34 of the fulcrum member 21ᵃ in maintaining these aligned axes and the axis Y—Y (see Figure 28) in the same vertical plane through the axis of the threaded tension rod 20.

As the several illustrative embodiments of our invention demonstrate, the corner clamp construction is multi-angular, throughout a wide range, in its capacity to be set in small increments of equi-angularity of its clamping members relative to the bisector of the angle made by the glass panels and in its capacity, through the coactions between the adjacent lever arms of the front clamping members and the nut 37 or nut 37ᵃ with its shell 53, to fixedly hold the angle to which the front clamping members are set; these lever arms and the nut (with or without the shell 53) are, moreover, interfitted or nested for ease and precision of equi-angularly setting, in minute increments and by a micrometer-like action, the two front clamping members to the desired angle and for thereafter, by direct action on these lever arms, dependably holding the clamping members at whatever angle the micrometer-like action has set them.

The back clamping parts 46, 47, being preferably integral or unitary and bendable at the integral bridge parts 68, 69, with the arcuate equalizing yoke 50, dependably coact, in the actions and functions just described, not only in ready adaptability to a wide range of change for the inside angle D and ready accommodation thereof to the fixed angularity given to the front clamping members 26, 27, but also in contributing to the achievement and maintenance of the desired rigidity of angularity of the various clamping parts; more specifically, these back clamping elements, all when assembled as above described, provide a rigid triangulation of clamping and holding forces, as will be apparent, in view of the foregoing, from a consideration of Figures 2, 17 and 23.

The inside angle D is the complement to the outside angle C, the two summing up to 360°. Though the coacting back clamping parts are shown in Figures 2, 17 and 23 assembled to panels A and B where angle D is less than 180°, the bendable back clamping part 45 and the arch-shaped yoke 50 function as above described when the angle D is greater than 180°; in the latter case the clamping parts 46, 47 are simply given a reverse bend, as it were, at the bendable bridge parts 68, 69 to suit the angle D, and in such case the arms 50, 50 of the equalizer yoke 50 in effect reach around the apex of such angle and maintain and equalize the pressure of clamping force, also with rigid triangulation of the forces involved.

The just-described relation is shown in Figure 33 and is there illustrated in plan rather than in perspective in order to show more clearly the relationships at the back or inside angle D and also to show certain variables in the relationship of parts at the front or external angle C as the latter is made smaller. In this latter connection, it will be noted by reference to Figures 1, 16, and 22 when compared with Figure 33, that the fulcrum member (21 or 21ᵃ) has the ends of its opposed side parts 33, 34 closest to the apex of front angle C when the latter is of maximum value and that fulcrum member and its parts 33, 34 recede from the vertex of angle C as the latter is diminished, being farthest therefrom when angle C is of minimum value; for practical purposes, a minimum value for angle C may be assumed to be 90° inasmuch as plate glass window or show case panels or the like of lesser front angles are rarely if at all met with in practice. For illustrative purposes, a 90° value for front angle C is assumed in Figure 33. The latter shows the substantial extent of recession of the fulcrum member from the vertex of angle C and that could be of a magnitude sufficient to bring the adjacent inner ends of the front clamping members above described, with which the nut 37 alone or nut 37ᵃ and shell 53 coacts, out of coacting relation with the opposed side parts 33, 34; that is why, in the foregoing description, we have given an illustrative range of change of front angle C from a value materially less than 180° (say, around 160°) to about 315°, for at the lower limit (just below 160°, illustratively) the desired nesting of interfitting parts between and with the opposed side 33, 34 would be disrupted.

Our invention, in the forms as illustrated and above described, is however well and easily adaptable to meet the needs of a range of front angle changes below any such possible limiting value as, for example, 160°. It will be noted that, in the forms above described, the lever-like portion of each front clamping member, that is, the portion that overlies the hollow fulcrum member, is substantially in line with the remaining portion of the clamping member that engages the panel front (see Figures 4, 13, 19 and 25); with respect to the fulcrum provided by the hollow fulcrum member, each front clamping member is in effect a straight-line lever, that is, its lever arms to either side of the fulcrum are in line with each other. As above indicated, with such arrangement, our device may be set throughout a range of front angle values from about 160° to 315°. If, however, we provide an angularity between the two lever arms of each front clamping member, we are enabled to shift the range of change of angle correspondingly; thus we illustrate in Figures 34–37 and we have selected the form shown in Figures 12–15 to illustrate how we effect this modification for this purpose.

Referring first to Figures 13 and 15, and as above described, by providing the bulge 55, we achieve an external angularity at 56 into which the upwardly concaved fulcrum edges 43, 44 (Figure 12) can seat or engage; the described arrangement of a bulge can thus leave the two lever arms of each clamping member 26ᵃ, 27ᵃ in line. At just about the same region where the re-entrant angularity 56 is formed in Figures 13, 15 and 12; we give the entire clamping member indicated at 26ᵃᵃ and 27ᵃᵃ in Figures 34–37, as by suitable stamping operations in forming it, a suitably sharp bend, thus to give the inside or overhanging short lever arm portion the desired angularity to the external lever arm portion that rests against the panel (A or B); illustratively, that angularity may be about 90° (see Figures 36–37). Externally that bend provides a re-entrant angularity 56$^a$ on the non-clamping side of the front clamping member in which the fulcrum edge (33 or 34) remains seated throughout pivoting movement of the clamping member about the fulcrum and holds the clamping member against detrimental longitudinal shift relative to the fulcrum member. That angularity 56$^a$ is sharpest at the longitudinal center line (see Figures 35, 36 and 37) and rounds off progressively in arcs or surfaces of revolution to either side of the center line in order to provide appropriate external surface curvatures to better coact with the upwardly concave fulcrum edges 43, 44 throughout changes in angularity of the clamping members 26$^{aa}$ and 27$^{aa}$ relative to the axis of the threaded tension rod 20.

The downwardly extending short lever arms as viewed in the drawings have cut-outs or slots 35 at their extreme ends within which tension rod 20 is accommodated when these lever arms are horizontal or substantially so and as the front clamping members 26$^{aa}$ and 27$^{aa}$ are equiangularly shifted about the fulcrum edges 43, 44 as the nut 37 or nut 37$^a$ and shell 53 move downwardly (in Figure 34) to change the angle of the panel clamping arm portions; they have external fragmentary spherical or convex surfaces so they can take inside against the correspondingly curved inside faces of the fulcrum member 21$^a$ (see Figure 37) at one limit of setting (shown in Figure 37) and they have inside spherical or concave faces to coact with the convex faces of the nut 37 or of the shell 53 where the latter is employed, as is shown in Figures 12 and 37, throughout change in angularity to the other limit of setting. The latter occurs when the control nut is threaded upwardly on tension member 20 to permit clamp members 26$^{aa}$, 27$^{aa}$ to each assume an angle of materially less than 45 degrees to the axis of the threaded rod 20 at about which point there is still maintained coaction of the nut 37 or of the nut and shell 53 with the concaved and now more or less horizontally positioned short lever arms as well as coaction of the latter with the upstanding opposed side portions 33, 34 of the fulcrum member 21$^a$.

Thus, adjustment or setting of front clamping members 26$^{aa}$, 27$^{aa}$ to match a small value re-entrant front angle C, such as the 90° angle shown in Figure 33, is easily achieved and the application of panel-clamping pressures by the back nut 51 and its coacting parts at the internal angle D (now of about 270°) proceeds as before described, accompanied by a suitable drawing-in action into the re-entrant front angle C of the front clamping members. In the illustrative modification just described, it will be seen that the available range of change of angularity has been shifted to a range in which the lower limit for angle C is changed from about 180° to much less than 90°, as a result of a 90° angularity between the two lever arms of each front clamping member. Were that re-entrant angularity in the lever arms to be made for example 135° or so, the range becomes from about 270° to about 90° for front angle C; thus a single conformation of front clamping member suffices to meet all front or external angularities varying between the panel angularity of 90° for its internal angle (as suggested in Figure 1 at D) to a panel angularity of 90° for its external angle (as in Figure 33).

However, the front clamping members of Figures 1 to 21 are, as earlier described, paired and are hence not only identical and interchangeable in each of the several forms there shown but also are so assembled as to permit ease of disassembly. Thus, one need only back off the nut 37 or 37$^a$ and as is clear from Figures 3 and 9, front clamping members 26 and 27 are easily detached, and from Figure 12 members 26$^a$ and 27$^a$ similarly easily removed as is true also of members 26$^b$ and 27$^b$ of the structure of Figure 18; accordingly it is easy, where a given panel installation requires it, to replace them by correspondingly constructed front clamping members in which each has suitable angularity between its two lever arm portions like that described in connection with Figures 34–35, an angularity that is re-entrant on the non-clamping side of each, with its vertex at and coacting with a fulcrum edge of the fulcrum member.

As above described, the tension rod 20, whatever its cross section, that is, whether round or partially round with a flat face, may be secured or connected, in any suitable manner, to the fulcrum member 21 so that the two are coaxial and so that, when the clamping construction is assembled to the glass or other panels and the rod 20 is placed in tension by the nut 51, the desired coactions and relationships between the various parts are achieved as above described; the mechanical connection between the tension rod and the hollow fulcrum member may be effected, in so far as certain features of our invention are concerned, by any suitable or known means, such as a threaded connection, welding or brazing or the like, but according to other features of our invention the threaded rod and the fulcrum member may be secured or connected together in the manner about to be described and as shown in Figures 29–32, in order to achieve certain other advantages of construction and assembly.

Turning first to Figures 29 and 30, we there show a construction adapted for connecting these two parts together when the tension rod 20 is round. In these two figures we show the bottom wall 23 of the fulcrum member, and in forming or shaping it we flatten it at its lower end to provide a circular flat portion 23$^a$ that is coaxial with the fulcrum member and at its center and axis we provide a hole 71 suited to receive therethrough the threaded rod 20, being therefore round as is better shown in Figure 21. The lower end, as viewed in Figure 30, of the threaded rod 20 has integrally formed therewith a head 20$^c$, which presents a flat annular face against the under side of the flat portion 23$^a$ of the bottom wall 23 and of the same diameter and which has an external surface that is a portion of a sphere of the same radius as the radius of the outside face of the wall portion 23, these two faces merging one into the other without disturbing the continuity of external dome-like appearance when viewed as in Figures 1, 16 and 22. With this construction the hollow fulcrum member is simply slipped onto the threaded rod 20 to bring the flat face of the head 20$^c$ into flatwise engagement with the flattened portion 23$^a$ of the wall 23, thus insuring proper alignment and coaxiality of the parts.

Where the threaded rod is half round and has a flat side face 20$^a$, we provide in the flattened wall portion 23ᵃ a half-round hole 72 as is better shown in Figures 31 and 32, as by broaching, but hole 72 is oriented with respect to the axes X—X and Y—Y in that its straight side, being a diameter, coincides with the axis X—X and its midpoint falls on the axis Y—Y. The lower end of the threaded rod is provided with a head 20ᶜ, as above described, being integrally formed therewith and providing an upper flat circular face that can mate with the under face of the flat wall portion 23ᵃ and has an external frusto-spherical face of the same radius as the outside face of the wall 23. As seen in Figure 32, the half-round rod 20 appears offset in relation to its head 20ᶜ, but it will be understood that the arcuate or curved surfaces of the two parts are coaxial, bringing the flat side face 20ᵃ in alignment with the diameter of the head 20ᶜ.

With this arrangement assembly of the hollow fulcrum member to the half-round headed rod 20, as by entering the free end of the half-round rod through the half-round hole 72 from the under side of the fulcrum member, thus also achieves an orientation of the flat side face 20ᵃ of the rod 20 transversely of the axis Y—Y and in line with the axis X—X for purposes earlier above described, the large flat engaging faces of the head 20ᶜ and of the flattened bottom portion 23ᵃ coacting to hold the fulcrum member and the threaded rod coaxial. Externally the head 20ᶜ merges into the surface of the wall 23 without disturbing the continuity of dome-like appearance as seen in Figures 1, 16 and 22.

In applying clamping devices at spaced intervals along the junction J of the panels A, B, (Figures 1, 16, 22 and 33), it is advantageous and desirable in certain installations, as in glass panels for store fronts, to apply to the front or external clamping members a cement or caulking compound, usually in plastic form, and with the device of our invention, after manipulating the nut, such as nut 37 or 37ᵃ, to set the angularities as above described to match the external angle C, the cement or compound is easily applied by smearing it into the hollow interiors of the front clamping members and into the exposed spaces of the hollow fulcrum member; the material can be applied in excess, and upon completion of assembly of the back clamping elements and upon tightening up the back clamping nut 51 surplus cement or compound is expelled as the filled hollow parts are pressed tightly against the faces of the panels. The excess or exuded material is simply wiped off, leaving the front or external structure which not only is cemented to the panels but also has its interior well sealed off from the atmosphere and the elements where the installation is an outdoor installation, as with a store front. Or sealing and protection may be provided as is about to be described.

We provide a two armed sealing and protective member 75 made of a suitable deformable and preferably resilient material, like rubber (natural or synthetic, or any other elastomer), which can be molded and cured to desired resiliency; it is shaped to provide, as shown in Figures 38–39, a central body portion 76, apertured at 77 for the passage therethrough of the threaded tension element or rod 20, for coaction under compression between the vertex of the angle C and immediately adjacent parts such as the nut 37 or 37ᵃ and fulcrum member 21 or 21ᵃ and it has two oppositely extending arm-like portions 78, 79 externally convexed to seat respectively into the concaved hollows of the two front clamping members such as 26ᵃᵃ and 27ᵃᵃ and presenting compressible faces or conformations as at 81, 81 that bulge above or beyond the plane of the peripheral edges of the front clamping members by which the latter engage flatwise against the panels.

As shown in Figure 39, the arms 78, 79 make an angle to each other and this, for front re-entrant angles (as in Figure 33), is preferably about equal to the smallest angle (for illustration, 90°) of the range of angle change of the front clamping members and for that angle the thickness (as seen in Figure 33) of the central body portion is somewhat greater as the distance along axis of threaded rod 20 from the apex of the re-entrant angle C (see Figure 33) to about the plane of the slotted face of nut 37 or nut 37ᵃ when in the position to set the front clamping members to the minimum front re-entrant angle. As above earlier noted, the spacing or distance just mentioned grows less as the re-entrant angle is increased from its minimum value. Resilient member 75 is assembled to the device shown in Figure 34 by sleeving its central body portion 76 onto threaded rod 20 after the clamp members 26ᵃᵃ, 27ᵃᵃ have been set to the desired re-entrant angle, the convex surfaces of the resilient arms 78, 79 seating respectively into the hollows of parts 26ᵃᵃ and 27ᵃᵃ and the convex surface of central portion 76 overlying the fulcrum member between the side parts 33, 34 of the latter, thus presenting the above-mentioned bulging conformations 81, 81 toward the panels A, B.

As shown in Figures 38 and 41, these bulging conformations 81, 81, which cross-wise of the arms and of the clamp members 26ᵃᵃ, 27ᵃᵃ are arcuate, progressively diminish from the ends of the arm portions 78, 79 to the point where they intersect each other and also the axis of hole 77. Under the pressures exerted by the clamping effects upon the panels A, B, the parts 78, 76, 79 of the rubber member 75 are compressed as the front clamp parts 26ᵃᵃ, 27ᵃᵃ are pressed against the panels and as the central portion 76 is compressed in the direction of the axis of the threaded rod 20, completely sealing off and protecting all portions of the device at the front of panels A, B except for the external surfaces as seen in Figure 33 and neatly filling the peculiarly shaped space or volume caused by the spacing of parts from the vertex of the re-entrant angle C.

As center part 77 is subjected to greater compression as angle C in Figure 33 is increased, it tends to flow or distort the rubber or rubber-like material laterally of itself and lengthwise into the adjacent ends of the hollow clamp parts 26ᵃᵃ, 27ᵃᵃ, such action also taking part when the member 75 is initially distorted into a greater angle to accommodate it and its arm extensions to a greater angle when the clamp parts are initially set for such a larger angle. The lengthwise tapering off, toward the apex of member 75, of the extent of the bulging of the conformations 81, 81, facilitates the above actions so that a rubber member 75 of given angularity as molded serves to make a good seal and neat appearance throughout a substantial range of re-entrant angularities.

At all values of the angle C (Figures 1, 16 and

22), the installed devices appear diminutive and are neat and attractive in appearance.

As above described, the front clamping members, in all forms, present flat or plane faces or surfaces which can rest flatwise against the outer or front faces of the glass panels A, B (see Figures 1, 16 and 22), and in the illustrative embodiments these faces comprise the peripherally continuous back edge faces of the concavo-convex front clamping members; through them the clamping pressures exerted on the two panels, in coaction with the back clamping parts 45, 46, are distributed throughout appropriate transversely extending areas or regions of the respective panels. In this connection it is pointed out that, in all forms, the concaved fulcrum edges or seats of the fulcrum member at the front end of the threaded tension rod and the external convex portions of the front clamping members that seat against these concave fulcrum edges provide for an appropriate range of relative rotational self-accommodation or self-adjustment therebetween as the fulcrum member presses and strains the front clamping members against the flat front faces of the respective panels. The front clamping members are thus permitted to come to rest flatwise against their respective panel faces for distribution to the latter of the clamping pressures and the fulcrum member is prevented from tending to tilt either or both of the front clamping members about their general longitudinal axes, such as the axis Y—Y above mentioned. For these purposes it will be understood, as above indicated, that the width of the holes 32 (Figures 3–5, 7 and 9–10) in the front clamping members 26, 27 is somewhat greater than the width of the hook-shaped lugs 24, 25 so that the clamping members can partake of self-adjusting rotational movement about the axis Y—Y (Figures 7 and 10) relative to their concave fulcrum edges 43—43 and 44—44. It will thus be seen that, in all forms, the convex outer portions of the front clamping members that rest in the respective concave fulcrum edges of the fulcrum member, in providing such self-centering or self-accommodating relative adjustments under the applied clamping forces, also contribute toward greater facility of installation and toward lessening risk of fracturing the glass panel or panels.

It will thus be seen that there has been provided in this invention corner clamping devices in which the several objects heretofore noted together with many thoroughly practical advantages are successfully achieved.

As many possible embodiments may be made of the above invention and as many changes might be made in the embodiments above set forth, it is to be understood that all matter hereinabove set forth or shown in the accompanying drawings is to be interpreted as illustrative and not in a limiting sense.

We claim:

1. A corner clamp construction for clamping panels of glass or the like in substantially edge-to-edge relation comprising a threaded tension element for passage through the panel junction and having suitably secured thereto and coaxial therewith, at its outer end, a hollow fulcrum member presenting side walls of substantially circular cross section, said side walls having diametrically opposed retaining portions adapted to be aligned with the panel junction and having diametrically opposed concaved fulcrum edges adapted to be aligned transversely of the panel junction so that each overlies a panel, a pair of elongated front clamping members which, in transverse cross section, are substantially concavo-convex to present their peripheral edges for flatwise engagement with the two panels, said concavo-convex clamping members being with their convex faces respectively seated against said diametrically opposed concaved fulcrum edges for pivoting movements relative to the latter, adjacent end portions thereof overhanging said fulcrum member interiorly to form two relatively short lever arms each to one side of said threaded tension element, sides of said overhanging portions of said concavo-convex members being received and substantially nested within and between said diametrically opposed retaining portions of said hollow fulcrum member, means coaxial with said threaded tension element presenting a surface that is a portion of a sphere for nesting within and engaging with the concave faces of said interiorly overhanging lever arms and comprising a nut in threaded connection with said threaded tension element whereby, in response to turning of the nut, the angularities of said concavo-convex clamping members relative to the axis of said threaded tension element are conjointly and equally set and fixed by a pivoting action thereof about their respective concaved fulcrum edges; means for holding said concavo-convex clamping members against detrimental lengthwise shift relative to their respective fulcrum edges for thereby maintaining substantially equal the effective lengths of said short lever arms, a pair of back clamping members adapted to rest against the respective inside faces of said panels, each to one side of said junction and respectively juxtaposed to said front clamping members, and means comprising a nut threaded onto the inner end of said threaded tension element and coacting with said back clamping members to tension said tension element.

2. A corner clamping construction as claimed in claim 1 in which said threaded tension element is full round and in which said surface that is a portion of a sphere is formed by an external face of said nut that is directed generally toward said hollow fulcrum member, said face of said nut having a curvature substantially the same as the concave faces of said overhanging short lever arms of said concavo-convex clamping members, for direct entry thereinto and direct coaction therewith.

3. A corner clamp construction as claimed in claim 1 in which said threaded tension element is substantially half round and thereby has a flat side face, and in which said means that is coaxial with said threaded tension element and presents said surface that is a portion of a sphere comprises a hollow substantially hemispherical shell whose external surface is of substantially the same curvature as that of the concave faces of said short lever arms for entry thereinto and coaction therewith, said nut having a radius of curvature substantially equal to that of the inside face of said shell and rotatively interfitting therewith, said shell having an aperture in its bottom closely matching the cross section of said half round threaded tension element for passage of the latter therethrough and for thereby coacting to hold said nut and said half round threaded tension element against detrimental relative displacement out of substantially coaxial relation.

4. A corner clamping construction as claimed in claim 1 in which said means for holding said concavo-convex front clamping members against material lengthwise shift relative to their respective concaved fulcrum edges comprises projections on said concaved fulcrum edges, said concavo-convex clamping members having recess means for respectively receiving said projections.

5. A corner clamping construction as claimed in claim 1 in which said means for holding said concavo-convex front clamping members against material lengthwise shift relative to their respective concaved fulcrum edges comprises upstanding ears, one for each fulcrum edge, each of said concavo-convex clamping members having an aperture spaced from its inner most end for respectively receiving said ears.

6. A corner clamping construction as claimed in claim 1 in which said means for holding said concavo-convex front clamping members against material lengthwise shift relative to their respective concaved fulcrum edges comprises means forming a bulge-like projection in the convex faces of said concavo-convex clamping members in those portions of the latter that overhang said hollow fulcrum member interiorly, thereby forming an external surface angularity in each and with which said fulcrum edges respectively engage.

7. A corner clamping construction as claimed in claim 1 in which said adjacent end portions of said clamping members each makes an angle to the remaining portion thereof that is a re-entrant angle on the convex side of the clamping member, the means holding said concavo-convex front clamping members against material shift lengthwise relative to their respective concaved fulcrum edges comprises the respective vertices of said re-entrant angles in which said concaved fulcrum edges are respectively received.

8. A corner clamping construction as claimed in claim 1 in which said adjacent end portions of said clamping members are substantially in line with the respective remaining portions thereof that respectively engage flatwise said two panels.

9. A corner clamping construction as claimed in claim 1 in which said adjacent end portions of said clamping members make an angle with the respective remaining portions thereof that respectively engage flatwise said two panels, said angles being re-entrant on the non-clamping sides of the clamping members for giving the latter a substantial range of change of front angularity less than 180 degrees.

10. A corner clamping construction as claimed in claim 1 in which said means for holding said concavo-convex front clamping members against material lengthwise shift relative to their respective concaved fulcrum edges comprises respective extensions of said concavo-convex clamping members along opposite sides of said threaded tension element and past the latter and presenting hook-shaped concavo-convex portions to opposite sides of said surface that is a portion of a sphere, said extensions complementing each other and overlying the hollow interior of said hollow fulcrum member.

11. A corner clamping construction as claimed in claim 1 in which said means for holding said concavo-convex front clamping members against material lengthwise shift relative to their respective concaved fulcrum edges comprises two integral bendable small-cross-sectioned connections between said two concavo-convex clamping members on opposite sides of said threaded tension element and substantially aligned along a diameter of said partially-spherical face and substantially at the opposed panel-engaging edge faces of said clamping members, said bendable connections being receivable between and respectively adjacent said retaining wall portions of said hollow fulcrum member for guidance thereof.

12. A corner clamp construction as claimed in claim 1 in which said nut has a portion directed toward the free end of said threaded tension element that is provided with wrench-engageable means that fall within a radius less than the radius of the side walls of the hollow fulcrum member for turning the nut by a wrench as it moves inwardly and outwardly of said hollow fulcrum member.

13. A corner clamp construction as claimed in claim 1 in which said nut has wrench-engageable means that comprises recess means in a portion directed toward the free end of said threaded tension element and on opposite sides of its axis and engageable by projecting means of a sleeve wrench removably sleeved on said threaded tension element from the free end thereof.

14. A corner clamp construction as claimed in claim 1 in which said threaded tension element is full round and said hollow fulcrum member has a round coaxial hole through which said tension element passes, the latter having a head external of the fulcrum member, said head and said fulcrum member having coacting flat seating surfaces for aligning one with the other.

15. A corner clamp construction as claimed in claim 1 in which said threaded tension element is half-round and said hollow fulcrum member has a half-round hole oriented relative to said opposed concaved fulcrum edges and through which said half-round tension element passes, the latter having a head external of the hollow fulcrum member, said head and said fulcrum member having coacting flat seating surfaces for aligning one with the other.

16. A multi-angular corner clamp construction for clamping panels of glass or the like which are in substantially edge-to-edge relation and make an angle with each other comprising a threaded tension rod for passage through the panel junction and having suitably secured thereto, at its outer end, a fulcrum member having two opposed fulcrum elements which are aligned on opposite sides of said threaded tension rod and equally spaced therefrom and thereby adapted to be aligned transversely of the panel junction so that each fulcrum element overlies a panel, two elongated front clamping members adapted to rest respectively against the front faces of said two panels having their longitudinal axes substantially aligned transversely of the panel junction and coacting respectively with said spaced fulcrum elements at points intermediate of the ends of the clamping members for pivoting movements relative to the respective fulcrum elements whereby adjacent end portions of said clamping members extend respectively from said fulcrum elements toward said threaded tension rod and form lever arms that underlie said fulcrum member, said lever arms being cut away at their adjacent ends to provide clearance for said threaded tension rod and to bring said lever arms close to said threaded rod, means comprising a nut threaded on said threaded rod and providing a face that overlies and bears against both adjacent lever arms and that is movable axially in response to turning of the nut to apply forces to said lever arms to pivot said elongated clamping members about their respective fulcrum elements for thereby conjointly and equally setting and fixing the angularities of said two clamping members relative to the axis of said threaded rod and thereby setting them to the angle made by the front faces of said panels, back clamping means providing parts adapted to rest against the respective inside faces of said panels, each to one side of said junction and respectively juxtaposed to said front clamping members, and means comprising a nut threaded onto the inner end of said threaded tension rod and coacting with said back clamping means to tension said rod.

17. A multi-angular corner clamp construction as claimed in claim 16 in which said back clamping means comprises an elongated plate-like member apertured at its center for the passage therethrough of said threaded rod and to provide side portions at opposite sides of the aperture that are bendable and which demark said elongated plate-like member into the aforesaid two parts for bending of the one relative to the other to fit into the angle formed by said inside faces of said panels for resting them respectively against said inside faces, said side portions holding said two parts rigidly together to reinforce the angle at the inside faces of the panels.

18. A multi-angular corner clamp construction as claimed in claim 17 in which there is interposed between the nut threaded onto the inner end of said threaded tension rod and said bent elongated plate-like member, a pressure equalizer in the form of a rigid two-armed substantially arch-shaped part with its arms in respective engagement with said two parts of said bent plate-like member.

19. A multi-angular corner clamp construction as claimed in claim 18 in which said threaded tension rod is in cross section half round and has its flat face aligned transversely of the line along which said two opposed fulcrum elements are aligned whereby, upon the passage of the rod through the panel junction, its flat face becomes aligned substantially with an edge face of one of said panels, said arch-shaped member having a substantially semi-circular central aperture therein, with the straight edge of the latter extending transversely of the line of the arms of said arch-shaped member, for passage therethrough of said half-round threaded rod and for aligning said two arms transversely of the junction between said panels.

20. A multi-angular corner clamp construction as claimed in claim 16 in which the face of the first-mentioned means that overlies and bears against both adjacent lever arms is a surface of revolution about an axis coincident with the axis of the nut, said adjacent lever arms having conformations adjacent said threaded rod that provide respective bearing surfaces for coaction with said surface of revolution throughout the range of pivoting of said front clamping members in response to turning of the nut.

21. A multi-angular corner clamp construction as claimed in claim 16 in which the face that overlies and bears against said adjacent lever arms is substantially frusto-spherical with its axis coincident with the axis of said nut, said adjacent lever arms having arcuate bearing surfaces against which said frusto-spherical face bears throughout the range of pivoting of said front clamping members in response to turning of the said nut.

22. A multi-angular corner clamp construction as claimed in claim 21 in which the arcuate surfaces of said adjacent lever arms extend substantially equally to each side of the longitudinal axis of the lever arm whereby the said frusto-spherical face, in seating against each of the opposed sides of the axis of said threaded rod, coacts in aligning the longitudinal axis of said two front clamping members.

23. A multi-angular corner clamp construction as claimed in claim 16 in which said elongated front clamping members have apertures at said points intermediate of their ends, said opposed fulcrum elements having respective parts entered into said apertures for holding said front clamping members against material movement lengthwise of their respective longitudinal axes.

24. A multi-angular corner clamp construction as claimed in claim 16 in which each of said lever arms of said two elongated front clamping members has projecting means coacting with its associated fulcrum element and positioned on that side of the latter toward said threaded rod for holding the clamping member against material displacement lengthwise away from said threaded rod.

25. A multi-angular corner clamp construction as claimed in claim 16 in which said lever arms are cut away, each along the longitudinal axis of the front clamping member, in the form of an open-ended slot whereby each of the adjacent ends of the two lever arms extends to both sides of said threaded rod for coaction with said face.

26. A multi-angular corner clamp construction as claimed in claim 16 in which said lever arms are cut away, each along the longitudinal axis of the front clamping member, in the form of an open-ended slot whereby each of the adjacent ends of the two lever arms extends to both sides of said threaded rod for coaction with said face, the respectively adjacent portions of said slotted lever arms on the two sides of said threaded rod being integrally connected, forming a bendable connection that responds to the forces applied thereto through said face in response to turning of said nut.

27. A multi-angular corner clamp construction as claimed in claim 16 in which the said adjacent ends of said lever arms are cut away along opposite sides of the aligned longitudinal axes of said two front clamping members along respective lines to provide lever arm portions that extend past and partially around said threaded rod, said portions substantially complementing each other and underlying said face for coaction therewith in response to turning of said first-mentioned nut.

28. A multi-angular corner clamp construction as claimed in claim 16 in which said threaded tension rod is full round and in which said face that overlies and bears against both adjacent lever arms is formed by an external face of said first-mentioned nut.

29. A multi-angular corner clamp construction as claimed in claim 16 in which said threaded tension rod is substantially half round and thereby has a flat side face, said face that overlies and bears against said adjacent lever arms of said front clamping members comprising an external surface of a shell having an aperture in its bottom closely matching the cross section of said half-round threaded rod for passage of the latter therethrough and for holding said shell against rotation about the axis of said rod, said shell having a portion that provides a surface of revolution about the axis of said aperture in the bottom of the shell and said nut having a surface of revolution interfitting with that of said shell for coacting to hold said nut and said half-round threaded rod against detrimental relative displacement out of substantially coaxial relation.

30. A multi-angular corner clamp construction for clamping panels of glass or the like which are in substantially edge-to-edge relation and make an angle with each other comprising a threaded tension rod for passage through the panel junction and having suitably secured thereto, at its outer end, a fulcrum member having two opposed fulcrum elements which are aligned on opposite sides of said threaded tension rod and equally spaced therefrom and thereby adapted to be aligned transversely of the panel junction so that each fulcrum element overlies a panel, two elongated front clamping members adapted to rest respectively against the front faces of said two panels having their longitudinal axes substantially aligned transversely of the panel junction and coacting respectively with said spaced fulcrum elements at points intermediate of the ends of the clamping members for pivoting movements relative to the respective fulcrum elements whereby adjacent end portions of said clamping members extend respectively from said fulcrum elements toward said threaded tension rod and form lever arms that underlie said fulcrum member, said lever arms being cut away at their adjacent ends to provide clearance for said threaded tension rod and to bring said lever arms close to said threaded rod, said threaded rod being half round in cross section with its flat side aligned transversely of the aligned longitudinal axes of said front clamping members whereby, upon passage through the panel junction, said flat side is aligned with an edge face of one of said panels, means comprising a nut threaded on said threaded rod and a shell with which said nut is coaxially and rotatively interfitted, said shell having a bottom wall that has an aperture therein closely matching the cross section of said half round threaded rod for passage of the latter therethrough and for holding said shell against rotation, said bottom wall providing a face that overlies and bears against both adjacent lever arms and that is movable axially as said shell is moved axially along said threaded rod in response to turning of the nut to thereby apply forces to said lever arms to pivot said elongated clamping members about their respective fulcrum elements for thereby conjointly and equally setting and fixing the angularities of said two clamping members relative to the axis of said threaded rod and thereby setting them to the angle made by the front faces of said panels, back clamping means providing parts adapted to rest against the respective inside faces of said panels, each to one side of said junction and respectively juxtaposed to said front clamping members, and means comprising a nut threaded onto the inner end of said threaded tension rod and coacting with said back clamping means to tension said rod.

31. A multi-angular corner clamp construction for clamping panels of glass or the like which are in substantially edge-to-edge relation and make an angle with each other comprising a threaded tension rod for passage through the panel junction and having a cup-shaped fulcrum member at its outer end and coaxially therewith with the open end of said cup-shaped member toward said panels and a diameter thereof substantially aligned with said junction, said cup-shaped fulcrum member having its rim on each side of said diameter cut away to provide two opposed concave fulcrum edges, two elongated front clamping members for engagement with the respective front faces of said two panels and having front surfaces which are convex and which seat respectively against said two opposed concave fulcrum edges with portions of the clamping members extending radially inward of the rim of the cup-shaped fulcrum member and toward said threaded tension rod, means comprising a nut threaded on said threaded rod and providing a face engageable with said portions of said front clamping members and operable to conjointly pivot said clamping members about said concave fulcrum edges for substantially setting the angle between said two clamping members to the angle of said panels, back clamping means providing parts adapted to rest against the respective inside faces of said panels, each to one side of said junction and respectively juxtaposed to said front clamping members, and means comprising a nut threaded onto the inner end of said threaded tension rod and coacting with said back clamping means to tension said rod.

32. A multi-angular corner clamp construction as claimed in claim 16 in which said cup-shaped fulcrum member has an outer end portion that is a portion of a sphere and terminates in a substantially flat end wall, said flat end wall having a coaxial aperture therein and said threaded tension rod extending through said aperture and terminating in a head that has a flat inner face to rest against said flat end wall and that has an outer face that is a portion of a spherical surface of the same radius as that of said cup-shaped fulcrum member.

33. A multi-angular corner clamp construction as claimed in claim 32 in which said aperture in the end wall of the cup-shaped fulcrum member is semi-circular with its straight edge aligned with said diameter of said cup-shaped fulcrum member, said threaded tension rod being half round in cross section whereby said straight edge of said aperture aligns the flat face of the tension rod with said diameter and transversely of the line of said two opposed concave fulcrum edges whereby, upon passage of the rod through the panel junction, its flat face becomes aligned substantially with an edge face of one of said panels and thereby said opposed concave fulcrum edges and said convex front clamping members respectively seated therein are substantially aligned transversely of said panel junction.

34. A multi-angular corner clamp construction as claimed in claim 33 in which said face that engages said inwardly extending portions of said front clamping members comprises an external surface of a shell having an aperture in its bottom closely matching the cross section of said half-round threaded rod for passage of the latter therethrough and for holding said shell against rotation about the axis of said rod, said shell having a portion that provides a surface of revolution about the axis of said aperture in the bottom of the shell and said nut having a surface of revolution interfitting with that of said shell for coacting to hold said nut and said half-round threaded rod against detrimental relative displacement out of substantially coaxial relation.

35. A multi-angular clamp construction for clamping panels of glass or the like which are in substantially edge-to-edge relation and make an angle with each other comprising a threaded tension rod for passage through the panel junction and having at its front end a fulcrum member provided with two concave fulcrum seats one on each side of said tension rod and equally spaced therefrom and thereby adapted to be aligned transversely of the panel junction so that each fulcrum seat faces toward and overlies a panel, two elongated front clamping members having plane back faces adapted to rest respectively against the front faces of the two panels with their longitudinal axes extending transversely of the panel junction and having their adjacent portions underlying said fulcrum member on opposite sides thereof, said underlying portions having front faces that are convex for seating engagement respectively in said concave fulcrum seats to permit relative rotary self-accommodation between the clamping members and the concave fulcrum seats as well as to permit pivot-like tilting of the clamping members toward and away from the tension rod to set them to the angle made by the front faces of said panels, back clamping means providing parts adapted to rest against the respective inside faces of said panels, each to one side of said junction and respectively juxtaposed to said front clamping members, and means comprising a nut threaded onto the inner end of said threaded tension rod and coacting with said back clamping means to tension said rod.

36. A multi-angular corner clamp construction as claimed in claim 16 in which said adjacent end portions of said front clamping members are substantially in line with the respective remaining portions thereof that respectively engage said two panels flatwise for giving the clamping members a substantial range of change of front angularity to include angles in excess of 180 degrees.

37. A multi-angular corner clamp construction as claimed in claim 16 in which said adjacent end portions of said front clamping members make an angle with the respective remaining portions thereof that respectively engage flatwise said two panels, said angle being re-entrant on the non-clamping side of the clamping members for giving the latter members a substantial range of change of front angularity to include angles materially less than 180 degrees.

38. A multi-angular corner clamp construction as claimed in claim 16 in which each of said lever arms of said two elongated front clamping members makes an angle to the remaining portion thereof that is a re-entrant angle on the non-clamping side of the clamping member, the re-entrant angles respectively receiving therein said spaced fulcrum elements of the fulcrum member.

39. A corner clamp construction as claimed in claim 1 in which there is provided an elongated sealing member of distortable material comprising an apertured central body portion that lies between the fulcrum member and the panels at the vertex of the angle of the latter with the threaded tension element passing through its aperture and having two integral extensions respectively received within hollows of said concavo-convex members and extending lengthwise thereof for engagement with the respective panels, said central body portion being distortably self-accommodating to variations in space between the fulcrum member and the angle-forming faces of the panels according to changes in angularity between the latter and said extensions being compressed in response to the clamping pressures of the clamping members against their respective panels.

40. A corner clamp construction as claimed in claim 39 in which the material of said sealing member is a resilient rubber-like substance and in which said central body portion thereof is a thickness lengthwise of the threaded tension member that passes through its aperture and in relation to changes in distance between the vertex of the front panel angle and said fulcrum member adapted for resiliently accommodating itself to the space therebetween.

RALPH N. GHERSIN.
GEORGE L. BRIGGS.

References Cited in the file of this patent
UNITED STATES PATENTS

| Number | Name | Date |
|---|---|---|
| 895,356 | Fells | Aug. 4, 1908 |
| 960,677 | McGann | June 7, 1910 |
| 2,103,832 | Tindall | Dec. 28, 1937 |